June 19, 1951  D. H. MONTGOMERY  2,557,454
TURNING TOOL
Filed Oct. 23, 1946  2 Sheets-Sheet 2

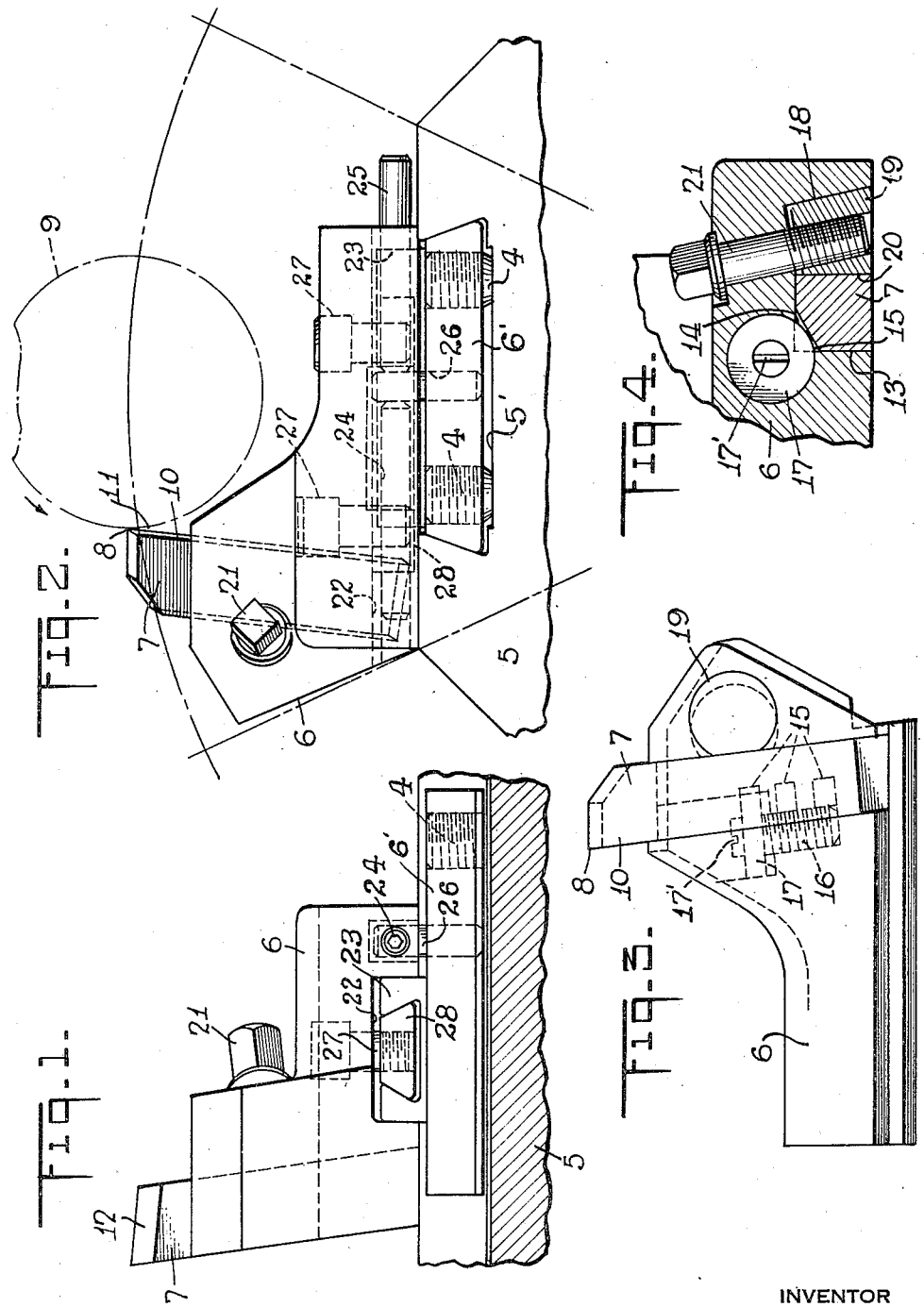

INVENTOR
Donald H. Montgomery
BY
Mitchell Bechert
ATTORNEYS.

Patented June 19, 1951

2,557,454

UNITED STATES PATENT OFFICE 2,557,454

TURNING TOOL

Donald H. Montgomery, West Hartford, Conn., assignor to The New Britain Machine Company, New Britain, Conn., a corporation of Connecticut Application October 23, 1946, Serial No. 705,200

1 Claim. (Cl. 29—37)

My invention relates to a tool, particularly a turning tool. This application is a continuation-in-part of my application Serial No. 383,320, filed March 14, 1941, now abandoned.

Generally speaking a turning tool bit is mounted so as to be adjusted in a direction generally radially of the work. Such a tool is rather difficult to adjust accurately in that any variation in the position of adjustment will make a corresponding variation in the diameter of the turned surface. Furthermore, a turning tool on a Gridley or like tool slide is conventionally mounted in a manner to cause side thrusts to be transmitted to the slide and thus tend to twist the same on its stem.

It is an object of my invention to provide an improved form of turning tool and the like.

It is a further object to provide an improved form of tool so mounted as to permit easy and accurate adjustment.

Another object is to provide an improved mounting means or positioning means for a tool.

Another object is to provide improved holding means for a tool bit.

Other objects and various features of novelty and invention will be hereinafter pointed out or will become apparent to those skilled in the art.

In the drawings which show, for illustrative purposes only, a preferred form of the invention—

Fig. 1 is a view in side elevation of an improved turning tool and holder illustrating features of the invention;

Fig. 2 is a view in end elevation of the parts shown in Fig. 1, related to a multiple spindle machine;

Fig. 3 is a view of the tool and holder shown in Fig. 2 but viewed from the opposite end;

Fig. 4 is an enlarged fragmentary sectional view, taken substantially in the plane of the line 4—4 of Fig. 3;

Figure 5:
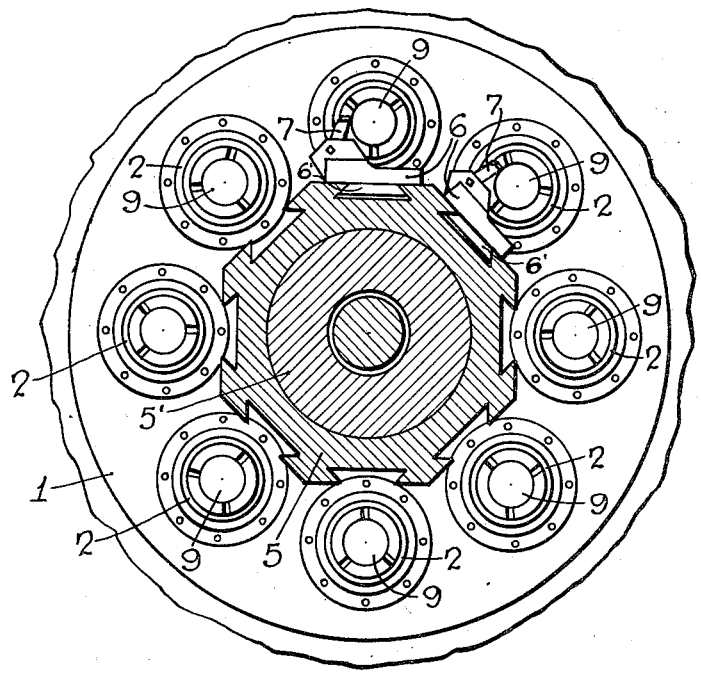
Fig. 5 is a sectional view taken substantially in the plane of the line 5—5 of Fig. 6, showing an eight-spindle bar machine.

The invention will be described as embodied in or used in connection with a tool slide which may be of the Gridley type and used on a bar machine.

In the drawings 5 indicates a tool slide, and a tool holder 6 is carried by the slide and may be accurately adjusted thereon by means to be described. Of course, the tool holder might be mounted for feeding movement on the member 5 but since the present invention relates mainly to the tool and its position and holding means, no description of such mechanism need be given.

In the form shown, the tool holder is of essentially two parts, and, of these, the numeral 6 identifies the tool-supporting part and the numeral 6' identifies what may be called the body part. The body part 6' may be shaped for reception in a dovetail groove 5' in the tool slide, and clamp screws 4 carried by the body part 6' may be jammed against the bottom of groove 5' in order to secure the body part 6' to the tool slide 5.

The body part 6' and the tool-supporting part 6 may include cooperating guide means whereby the part 6 may be limited to adjustable movement transversely of the tool slide groove 5'. As shown, the tool-supporting part 6 is transversely recessed or grooved at 22 for guided reception of a slotted block 23, which in turn may be integral with the body part 6'. For adjustable placement of the tool-supporting part 6 relatively to the body part 6', twin opposed screws 24—25 may be carried in the part 6 for adjustable squeezing abutment with a pin 26 mounted on the body 6'. It will be appreciated that, by taking-up one of screws 24—25 while backing-off the other, a range of desired adjustments of the tool-supporting part may be made; if desired, a given adjustment may be locked by means of screws 27 carried by the part 6 and taking into a wedge 28 in the dovetail slot of block 23.

The tool holder 6 carries a tool bit 7 which, in the form shown, is substantially square in cross section, as shown more particularly in Fig. 4. The bit is carried by the tool holder 6 in such position that the cutting edge 8 thereof engages the work substantially at the point of tangency of the surface of the work piece 9 and the longitudinal side or edge 10 of the bit. The bit 7 is not strictly tangent to the surface of the work piece 9 but is tilted very slightly, so as to provide the necessary front clearance, as indicated at 11. The end of the tool is ground off, as shown at 12, to provide a desirable top rake. The tool is also mounted at a slight forward angle, as indicated particularly in Fig. 1, so that the tool may be caused to approach the spindle nose quite closely and also to provide feed clearance.

The tool bit 7 in the preferred form is held against a solid abutment surface on the tool holder 6 and, in the preferred form, such abutment surface or shoulders are formed by one side 13 and the bottom of the transversely extending slot 14 in the tool holder, such slot being of a size to receive at least sufficient of the bit 7 to adequately support the same.

I have provided means for adjusting the bit up and down (as viewed in Fig. 2), so that the tool may be readily adjusted after each grinding. The bit may be provided with one or more transverse grooves or notches 15 in one edge thereof and the holder may carry a screw 16, having a head 17 to engage in the groove 15. Thus, when the screw 16 is turned, as by means of a screw driver engaging the slot 17', the bit 7 will be raised or lowered, as desired.

I have also provided improved means for holding the bit on the tool holder. In the form illustrated the holder has a recess 18, preferably cylindrical in form and intersecting one side of the slot 14. Within the recess 18 is a generally cylindrical plug member 19, having the side 20 slabbed off at an angle to the axis, so as to engage the adjacent side of the bit 7. It will be noted that the recess 18 is located at an angle to the sides of the slot 15, so that when the plug 19 is drawn inwardly the bit will be wedged very securely against the side 13 and bottom of the slot 14. Means, such as a cap screw 21, threaded into the plug 19 may serve to actuate the plug or wedge 19, as will be understood.

It will be seen that since the tool extends substantially tangentially to the turned surface of the work piece 9, any inaccuracies in adjustment of the bit 7 up and down will have substantially no effect on the turned diameter. This is particularly important since each time the tool is ground it should be reset and any inaccuracies in the resetting will reflect hardly at all in the turned diameter. Since the maximum tool pressure is downward, as viewed in Fig. 2, and along the length of the tool 7, the stresses are transmitted to the tool carrier 5 in such a way as to minimize the twisting effect usually encountered with the overhang type of tools heretofore mentioned. The tool 7 may be very quickly removed for grinding and replaced and very quickly and accurately adjusted by means of the screw 16, and even if the tool be adjusted but roughly such rough adjustment will not vary the turned diameter to any appreciable extent.

Figure 6:
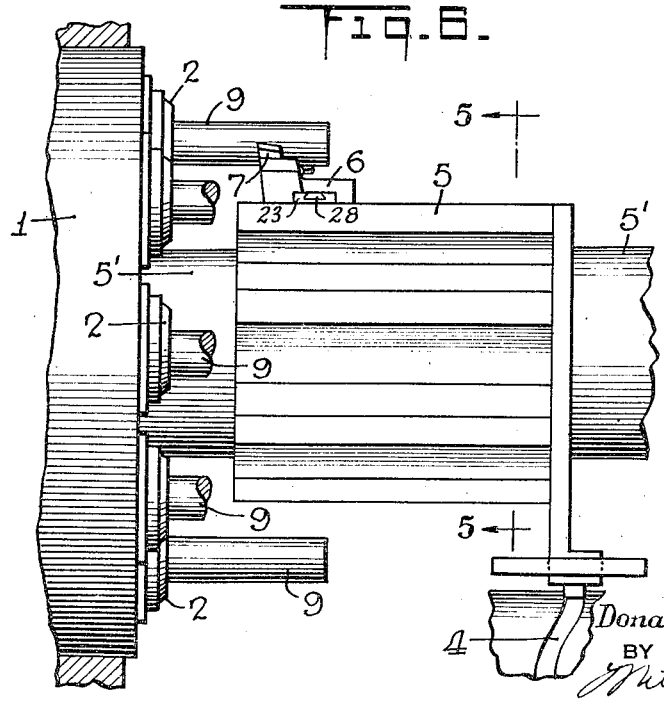
Fig. 6 is a fragmentary side view in partial section of an eight-spindle bar machine.

As has been indicated, this invention is particularly adapted for embodiment in a multiple spindle bar or chucking machine having a "Gridley" type of tool slide, for example as shown in Gridley et al. Patent No. 2,055,435. Since such machines are well known, no specific description need be given. The symmetrical Gridley slide 5 shown is of the type having eight tool holding sides and a piece of work 9 (Figs. 2, 5, 6) is shown in each of eight corresponding spindles of an eight spindle machine. The spindle carrier 1 for the rotatable spindle 2 is indexible (by means not shown) to bring the work pieces seriatim into positions to be acted upon by each of the tools (only two tools are shown). The tool 5 slides on the stem 5' and is moved as by means of a cam 4.

The tool and associated parts are so proportioned as to lie substantially completely within each respective tool slide and spindle sector indicated by radial dot-dash lines in Fig. 2. The sector lines or radii bisect the angles formed by radii passing through adjacent spindles and the axis of the tool slide and spindle carrier, as will be understood. The parts are shown now positioned for turning the largest diameter which the design of the machine permits. The sector radii may be considered as defining planes or blank walls between which all parts function. Furthermore, in the preferred form the cutting edge of the tool is substantially in the spindle circle (through the axes of all spindles) indicated by the dot-dash arc or inside the horizontal tangent to the spindle circle. All adjustments may be made by tools acting between the dot-dash sector radii shown. Thus, with all tools designed to operate within spindle and tool slide sectors, there need be no interference between tools on the slide 5 nor interference with adjustment of one tool by another. Furthermore, by positioning the tool as shown within the spindle sector, there need be no interference with forming or facing tools and, as stated, the major thrusts on the tool (tangential to the work 9 at the cutting edge) are directed substantially toward the center of the tool slide 5, thus avoiding most of the twisting strains on the tool slide such as occur with conventionally placed tools.

While a specific type of turning tool has been illustrated, it should be understood that other types may be employed and, in fact, a tool having, say, a profiled leading edge might be employed. Such a profile tool might be held in the holder by a section corresponding to the square bit shown.

While the invention has been described in considerable detail and a preferred form illustrated, it is to be understood that various changes and modifications may be made within the scope of the invention as defined in the appended claim.

I claim:

In a machine of the character indicated, a spindle rotatable about its own axis, a tool slide, said spindle and said slide being longitudinally movable relatively to each other and being indexible relatively to each other about an axis spaced from and substantially parallel to said spindle axis, a tool holder including a body portion secured on said tool slide and a tool-supporting portion, guide means cooperating between said body portion and said tool-supporting portion, whereby said guide means may guide said tool-supporting portion for movement relatively to said tool slide, adjustable securing means for adjustably securing said body portion to said tool-supporting portion along said guide means; said guide means, when said tool holder is in the index position for cooperation with said spindle, being directed only substantially normal to the plane which includes said index axis and said spindle axis, whereby in said index position said tool-supporting portion may be adjusted only substantially normal to the plane which includes said index axis and said spindle axis; and a bar tool carried by said tool-supporting part and oriented substantially radially of said index axis when in said index position to present a cutting edge substantially on a line through said spindle axis and substantially normal to said plane, whereby by means of a single adjustment of said securing means for a range of cutting radii for said tool on work supported by said spindle and at said index position, the thrust developed by action of the tool on the work may always be directed along said tool and generally radially of said index axis.

DONALD H. MONTGOMERY.

REFERENCES CITED

The following references are of record in the file of this patent:

UNITED STATES PATENTS

| Number | Name | Date |
| --- | --- | --- |
| 1,015,903 | Mills et al. | Jan. 30, 1912 |
| 1,092,462 | Trobeck | Apr. 7, 1914 |
| 1,222,643 | Lovejoy | Apr. 17, 1917 |
| 1,799,291 | Floeter | Apr. 7, 1931 |
| 1,854,672 | Robinson et al. | Apr. 19, 1932 |
| 2,055,435 | Gridley et al. | Sept. 22, 1936 |
| 2,229,112 | Miller et al. | Jan. 21, 1941 |
| 2,257,169 | Hoffs | Sept. 30, 1941 |
| 2,305,756 | Antonelli | Dec. 22, 1942 |